United States Patent [19]

Soelter

[11] Patent Number: 4,645,142
[45] Date of Patent: Feb. 24, 1987

[54] IMPACT ATTENUATION

[75] Inventor: Michael Soelter, Bremen, Fed. Rep. of Germany

[73] Assignee: MBB GmbH, Bremen, Fed. Rep. of Germany

[21] Appl. No.: 564,476

[22] Filed: Dec. 21, 1983

[30] Foreign Application Priority Data

Dec. 23, 1982 [DE] Fed. Rep. of Germany ....... 3247694
Jun. 29, 1983 [DE] Fed. Rep. of Germany ....... 3323348

[51] Int. Cl.$^4$ .............................................. B64D 1/14
[52] U.S. Cl. ............................ 244/100 A; 244/138 R
[58] Field of Search ............... 244/100 A, 138 R, 139; 188/268, 1266; 180/121, 122, 125, 127, 129

[56] References Cited

U.S. PATENT DOCUMENTS

| 2,887,055 | 5/1959 | Bagdanovich et al. | 244/138 R |
| 3,738,597 | 6/1973 | Earl et al. | 180/129 |
| 3,964,698 | 6/1976 | Earl | 244/100 A |
| 4,111,277 | 9/1978 | Peissel et al. | 180/122 |

Primary Examiner—Galen Barefoot
Attorney, Agent, or Firm—Ralf H. Siegemund

[57] ABSTRACT

One end of a hose is affixed to the underside of the object which may descend and whose impact has to be cushioned while the other end of the hose is pulled through the first end, the two ends are separately fastened permitting filling of the hose; a second hose may be inserted in the first one to provide separate filling spaces, one being the interior of the second hose and the other one being the gas space between the two hoses whereby different pressures permit selection of the resilient characteristics of the cushion.

5 Claims, 9 Drawing Figures

IMPACT ATTENUATION

BACKGROUND OF THE INVENTION

The present invention relates generally to the recovery and salvage of unmanned aircraft or other type of vehicles which upon descent are braked by means of a parachute and which, furthermore, upon impact on ground are cushioned in an appropriate manner.

Loads which are descending by means of a parachute should not impact upon ground without attenuation. Therefore, it has been proposed to provide such a load on its underside with annularly or toroidally shaped air cushions. Depending upon the material used for such a hose the cushion will be compressed to some extent upon impact. However, the inherent resiliency of such a structure will cause, in effect, the load to be propelled back, i.e. upwardly. In fact, the load may undergo a kind of oscillatory motion pursuant to which it will impact several times and be propelled back upwardly. Only after several such impact cycles it will come to rest.

Of course, it has to be considered that the load as it descends by means of a parachute, does not sink directly in vertical direction but depending, for example, on the wind and the initial throw speed the load has also a horizontal component of movement. This means that the load will meet the ground somewhat askew and the annulus is correspondingly irregularly deformed depending upon the composite motion and attitude of the load in the instant of impact. Moreover, the horizontal component of movement will cause the load to be dragged, to some extent, across the ground. This motion is not necessarily a stable, particularly in lateral direction with respect to the direction of horizontal movement, which means that the load may fall sideways and roll over.

DESCRIPTION OF THE INVENTION

It is an object of the present invention to provide a new and improved impact cushion for attenuating the impact of a load which descends toward ground, for example, by means of a parachute, and to construct this cushion to enhance and improve lateral stability with respect to any horizontal motion the load may have on impact;

It is another object of the present invention to provide a new and improved material for utilization as an annulus serving as a cushion for descending loads and permitting particularly deformation so that the normal impact of a load, as it produces internally an increase in pressure, will cause an immediate deformation of the material on account of this pressure increase so that the pressure increase will not or only to a very insignificant extent act as an agent of resiliency that tends to propel upwardly the load as a whole.

It is another object of the present invention to provide a new and improved impact attenuating cushion for use under conditions as described which offers adequate versatility, particularly with regard to adjusting modification or predetermination of the resiliency of such a cushion, the adjustment is to be made in the simple manner. provide a new and improved impact attentuating cushion which remains opeational even in case of damage.

It is another object of the present invention to provide suitable adjustment of the gas filling of such an impact attentuating cushion in dependence upon the expected rate of descent and weight of the load whose impact is to be attentuated.

In accordance with the preferred embodiment of the present invention, an impact attenuating cushion is suggested to be made of a plastically deformable hose-like foil having one end inverted, i.e. turned inside-out and having been pulled through the other end so that between the wall of the telescoped ends an opening is formed for the introduction of a pressurized gas. Moreover, that one end of the hose which is being pulled through the first mentioned end is fastened centrally while the first mentioned end is fastened in a ring-like holder.

The invention offers the advantage that hose-like foil parts can be used whereby the impact attenuation as it is determined by the height of the cushion will in fact be determined by the length of the hose-like foil. Foils and hoses of the type to which the invention pertains are available on the market and do not require any special working. In order to provide the toroidal impact attentuating cushion, one end of the hose is turned inside out and pulled through the other end in order to produce a foil sack of overall annular configuration and having also an annular opening. This configuration permits the transfer of shear forces as are applied through friction on the ground towards the cushion suspension at the bottom of the load. In view of the central fastening of the hose construction, a very simple storage in a cassette is made possible.

The particular impact attenuating cushion can be easily manufactured and is basically comprised of only very few elements. It is of particular importance that shaping and other working steps such as bonding and welding is avoided which is of advantage because these processes do all more or less tend to weaken the cushion material. The central closure of the cushion makes sure that all portions of the cushion are available for gas filling in a strictly symmetrical fasion as seen from the center of the arrangement.

In cases, it may be necessary to provide for a better matching of the cushion to the conditions one expects the structure to encounter. Therefore, in furtherance of the invention it is suggested to use two (or more) hoses, one inserted in the other one, so as to obtain two separate cushions. This way it is possible to adjust the stiffness of the cushion as a whole through adjustment of the pressure differential between the two cushions; this in turn amounts to an adjustment of the resilient characteristics of the cushion as a whole. The adjustability of the resiliency of this cushion can be improved further in that between the walls of the several hose ends which are in a nested relationship, one provides several openings for the introduction of pressure gas so that the degree of filling of the two sacks is made to differ under utilization of appropriate valves. This different degree in filling depends upon the expected energy of descent ($V^2 M/2$) i.e. upon the speed of descent as well as the mass and inertia of the structure as a whole. The degree of filling of the two sacks may, moreover, be determined by means of temperature and for this purpose temperature sensitive elements may be included in the strucure.

DESCRIPTION OF THE DRAWINGS

While the specification concludes with claims particularly pointing out and distinctly claiming the subject matter which is regarded as the invention, it is believed that the invention, the objects and features of the invention, and further objects, features and advantages thereof will be better understood from the following description taken in connection with the accompanying drawings in which:

Proceeding now to the detailed description of the drawing, FIG. 1 illustrates an impact attenuating cushion with central fastening to a load (represented on a structure part 6) whose descent it is to cushion and under utilization of a hose-like foil 1. That foil or hose has a first end 7 and a second end 8. The hose is inverted, i.e. turned inside-out in parts and the end 8 is centrally run through the end 7, the inverted inside-out end 8 actually projecting beyond the hose end 7. The hose end 7 is fastened through a ring holder 3 to the load body whose descent the cushion is to attenuate and being represented by a frame of shell structure 6. The fastening is such that there is sufficient space for turning inside-out and pulling the other hose end 8 through the end 7. Moreover, an annular gap is to be established so that gas, i.e. a pressurized filling for the cushion can be provided for.

Figure 1:
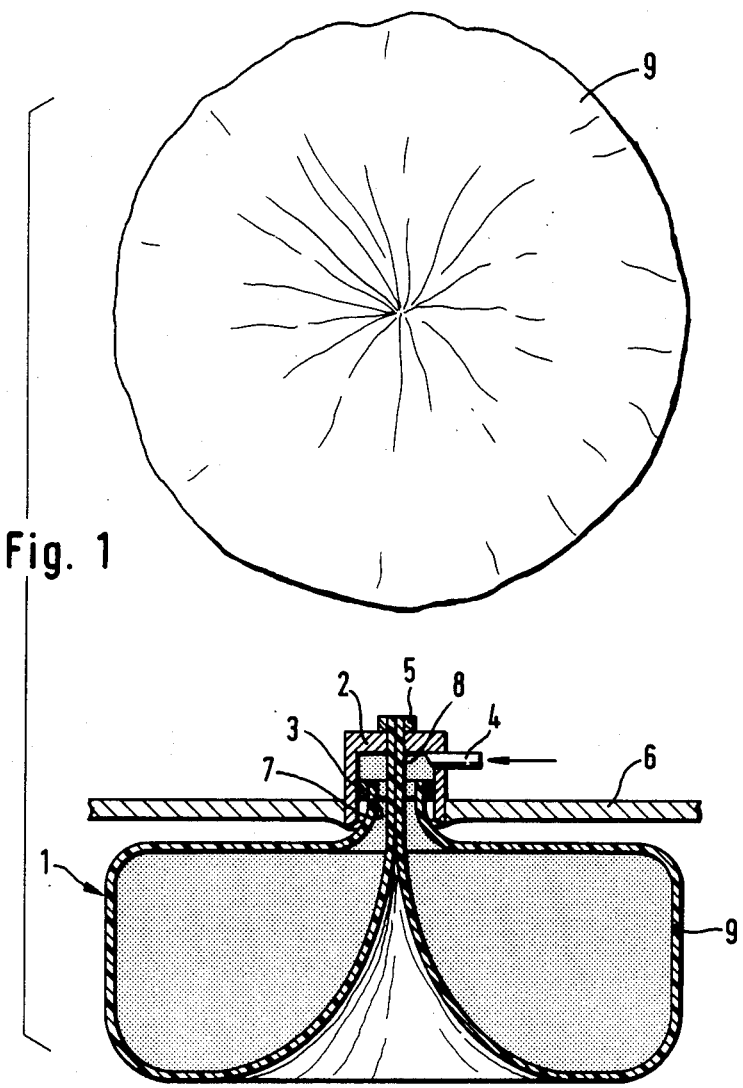
FIG. 1 illustrates respectively in portions 1a and 1b a bottom elevation and a section through an impact attentuating cushion in accordance with the preferred embodiment of the present invention.

The annular fastening ring 3 is inserted in a chamber defining cap 2 which on one hand centrally fastens the end 8 of the hose while being on the other end secured to the load structure 6. Ring 5 fastens hose end 8 to cap 2. The load structure is such that the part 6 has a sufficiently wide abutment surface for engagement with the cushion on impact so as to particularly provide for a broad surface into which the impact energy can be reacted with a small per area force. The pressurized gas was previously fed into the cushion by means of an inlet 4 for the chamber defining cap 2 and it can readily be seen that gas will enter the interior of the hose 1 through the gap between the inside end end 7 and the inside-out end 8. Accordingly, thee interior 9 of the hose will be inflated.

Figure 2:
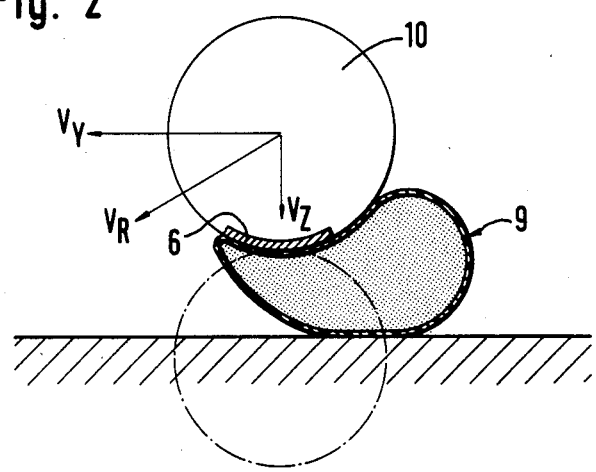
FIG. 2 illustrates a known, prior art impact attentuating cushion in a schematic manner illustrating particularly the deformation as it occurs on impact and under unequal load conditions.

The inventive arrangement is of particular advantage if the object such as fuselage 10 of a load to which such a cushion is affixed descends rather gradually at a speed $V_Z$ while being subjected to lateral wind forces, for example, of the rate $V_Y$. For purposes of comparison, FIG. 2 illustrates a regular, prior art impact attenuating cushion C when affixed to a load body 10. In view of the lack of lateral guidance the cushion C will tend to roll out from under the body 10 because of the moving component $V_Y$. The vector $V_R$ denotes the speed of the assembly 10-C during the last instant of descent. The dash-dot line is an example for the undeformed cushion C and it can readily be seen that the lateral displacement causes the body 10 to roll over.

Figure 3:
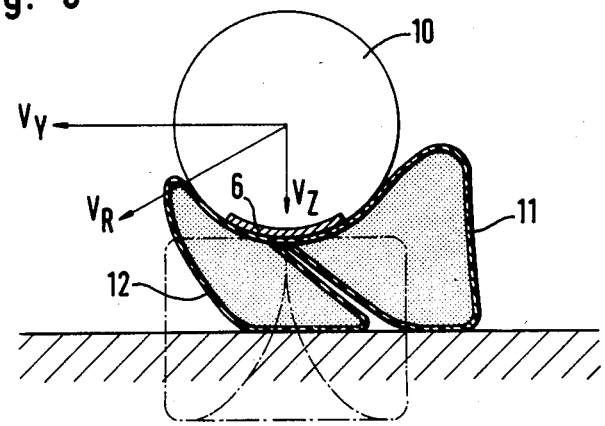
FIG. 3 illustrates a cross section through the impact attentuating cushion as shown in FIGS. 1a and 1b as it is deformed on impact under the same conditions prevailing as shown in FIG. 2.
Figure 4:
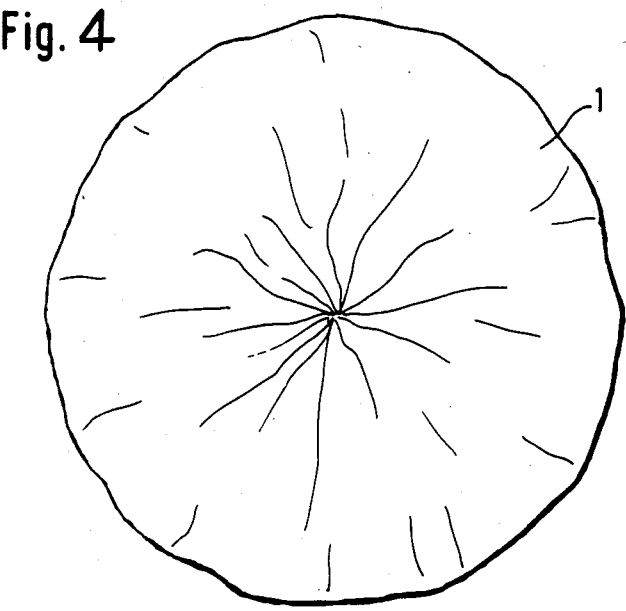
FIG. 4 illustrates a bottom view similar to FIG. 1b.

FIG. 3 illustrates the same conditions but when a cushion of the kind 1 is used. The wind and motion conditions are the same so there is a tendency for the body 10 after impact to continue movement in the direction of vector $V_Y$. The cushion is centrally affixed to the bottom structure 6 of the load 10 so that different portions of the cushion are affected differently but the cushion will not cause rollover of the body 10. The side 11 of the cushion facing away from the direction of movement is tensioned so that the forces of impact can be reacted fully into the body 10. On the other hand the stretching of portion 11 prevents the frontal portion 12 (as far as the imparted movement is concerned) from being deflected to incur rollover conditions for the load. Due to the gathering of the lower hose side, one obtains a trumpet shaped configuration facing the ground and being loaded under pressure to a small extent only. This configuration is particularly suitable for interaction with the ground upon which the assembly descends.

The hose is made of a plastically deformable material. The hose-like foil as made originally does not require any particular working if, in fact, made as an integral hose. This way, working steps such as welding, bonding or the like can be avoided. The plugging of one end of the hose into the other establishes a cushion which has its largest tension for plastic deformation on the side walls which are basically vertical or with a strong vertical component with regard to the horizontal surface plane on which the cushion may rest with the load on top.

It should be noted that it is not entirely necessary that the inside out hose end is actually pulled through the other end of the hose. The illustrated configuration, however, is preferred; nevertheless, sufficient strength is obtained when the portion turned inside-out is gathered by means of string or the like and only that string is pulled through the other hose end. How far one pulls the inside-out end portion can then be determined through pulling of that cable.

A still more favorable arrangement is depicted in FIGS. 4 through 8. The system basically includes the hose 1 as before and the elements 3, 5, 4 and 6 are all of the same or of the same kind as described earlier. However, a second hose 13 is used in a nested, concentric relationship to the hose 1, whereby the end 7 of the hose 1 is again directly affixed to the fastening ring 3 while the corresponding end 17 of the hose 13 is affixed to that ring but through spacers leaving a gap 27 betweeen the ends 7 and the 17. On the other hand, the end 8 of the hose 1 and the corresponding end portion of the hose 13 are turned inside-out together and are also gathered together for being affixed together by the clamping and fastening structure 5. It can thus be seen that separate passage ways are provided, one leading into the gap space between the hoses 1 and 13 while the other leads into the interior of the hose 13.

Figure 6A:
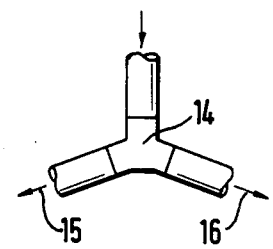
FIG. 6a and 6b illustrate respectively the top and side views of a valve used in the arrangement of FIG. 5.
Figure 6B:
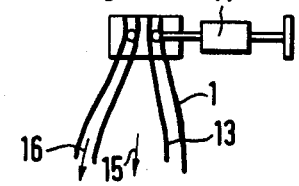
Figure 5:
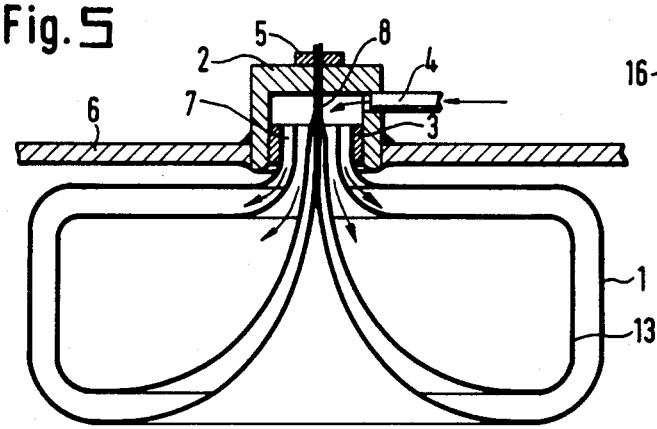
FIG. 5 illustrates a cross section through an impact attenuating cushion in accordance with the preferred embodiment of the present invention for practicing the best mode thereof.

The central mounting element 2 is again placed with respect to the body 10, and here particularly the bottom frame portion 6 so that a sufficiently large area is made available through which the cushion can react the impact forces into the body 10 at a relatively small per unit area force. This aspect is the same as described as before. A valve 14 is associated with the end opening 17 between the two hoses 1 and 13 which valve is, for example, constructed as a three-way valve as shown in FIG. 6a so that the filling gas can either follow the arrow 16 into the gap space between the hoses 1 and 13 or the filling path may be as denoted by arrow 15 to fill the interior of hose 13.

It, therefore, is possible to establish different pressure conditions in the two filling spaces whereby, of course, the filling of the hose 13 inflates generally the cushion as a whole while the peripheral contour is established through the particular pressure that is applied to the gap spaced between the hoses 1 and 13.

Figure 7:
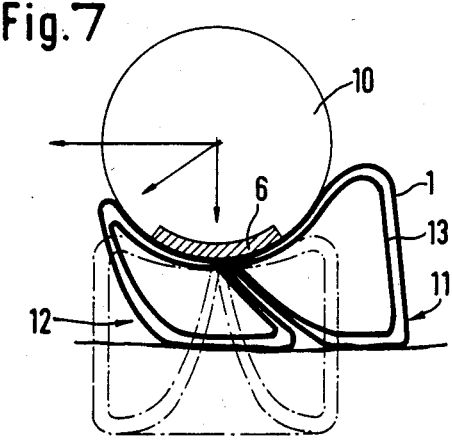
FIG. 7 illustrates a schematic section view of an impact attenuating cushion shown in FIG. 5 but under impacting conditions, the conditions being the same as shown in FIG. 2 and FIG. 3.
Figure 8:
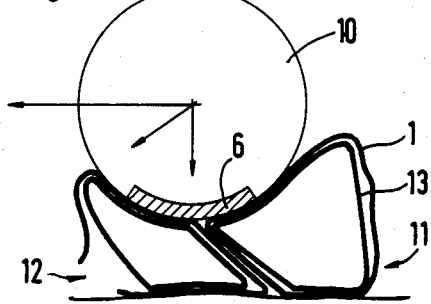
FIG. 8 is a view similar to FIG. 7 shown also under similar impacting conditions but with the additional assumption that the outer cushion has ruptured.

FIGS. 7 and 8 illustrate two instances of impact. In particular, it can be seen from FIG. 7 that again upon impact of the cushion as described, particularly in view of the central mode of affixing this particular cushion, the side 11 facing away from the component of lateral movement is stretched so that the forces provided on impact are with certainty reacted broadly into the body 10. On the other hand, the central affixing will distort the side 12 of the cushion but the escape of the cushion from under the body 10 is prevented. The dash-dot line in FIG. 7 denotes again the undistorted cushion configuration as it exists, for example, prior to impact. Due to gathering of the lower hose sides, one provides again a cushion portion which faces the bottom and is under pressure only weakly loaded which, of course, is of advantagee for taking care of additional load conditions resulting from particularity of the bottom on which the assembly impacts.

In the case of a rupture as depicted in FIG. 8, and particularly of the outer hose 1, one still has available the effect of the inner hose 13. Such rupture may occur if, for example, the rate of descent is faster than anticipated. In this case, the interior of hose 13 covers so to speak the opening resulting from the rupture, so that first of all a rapid pressure reduction of the gap space between the hoses 1 and 13 is avoided and the outer skin i.e. hose 1 remains loaded bearing element. The pressure reduction in the aforementioned gap space is therefore a delayed one which is highly beneficial for taking up the landing and impact.

It can readily be seen that more than two nested hoses can be used in a hierarchial arrangement with multiple gap spaces and a final interior space. It was assumed that the two hoses 1 and 13 are made of the same material; however, this is not essential. They may be made of different material having different deforming characteristics so that the overall pressure and resilient behavior of this system is modified accordingly.

The invention is not limited to the embodiments described above but all changes and modifications thereof, not constituting departures from the spirit and scope of the invention are intended to be included.

I claim:

1. A device for attentuating the impact of a descending body comprising:
    a plastically deformable hose having a first end affixed to said object and defining an opening into the hose;
    the other end of the hose being inverted and turned inside out and telescoped through the first mentioned end so that a gap and filling space is defined between the two ends;
    means for centrally fastening said inverted, inside out end to the object; and
    means defining a filling chamber in communication with gap space between said ends for filling the interior of the hole with pressurized gas.

2. A device as in claim 1 wherein said inside out end is affixed to said means defining an ante-chamber for filling the interior of the hose.

3. A device as in claim 1 and including a second hose in the interior of the first hose the second hose also having first and second ends, the first end being affixed to the object adjacent to but spaced from the first end of the first mentioned hose, so that the interior of the second hose and space between the first and second hoses can be filled separately.

4. A device as in claim 3 wherein the second ends of the two hoses are gathered together centrally affixed to the object.

5. A device as in claim 3 including valve means for separately filling said spaces.

* * * * *